US007850077B2

(12) United States Patent
Talwerdi et al.

(10) Patent No.: US 7,850,077 B2
(45) Date of Patent: Dec. 14, 2010

(54) APPARATUS AND METHOD FOR SECURE IDENTIFICATION OF SECURITY FEATURES IN VALUE ITEMS

(75) Inventors: Mehdi Talwerdi, North Vancouver (CA); Gregory Piller, North Vancouver (CA)

(73) Assignee: VeriChk Global Technology Inc., North Vancouver (CA)

( * ) Notice: Subject to any disclaimer, the term of this patent is extended or adjusted under 35 U.S.C. 154(b) by 93 days.

(21) Appl. No.: 11/660,873

(22) PCT Filed: Aug. 22, 2005

(86) PCT No.: PCT/CA2005/001279

§ 371 (c)(1),
(2), (4) Date: Feb. 22, 2007

(87) PCT Pub. No.: WO2006/021083

PCT Pub. Date: Mar. 2, 2006

(65) Prior Publication Data

US 2008/0041941 A1 Feb. 21, 2008

Related U.S. Application Data

(60) Provisional application No. 60/604,183, filed on Aug. 23, 2004.

(51) Int. Cl.
*G06K 5/00* (2006.01)
*G06K 19/06* (2006.01)
*G06F 17/00* (2006.01)

(52) U.S. Cl. ....................... 235/382; 235/375; 235/380; 235/382.5; 235/449; 235/457; 235/487; 235/491; 235/493; 235/494

(58) Field of Classification Search ................. 235/375, 235/380, 454, 487, 491, 493, 494, 462.34, 235/462.27, 449, 382, 382.5, 457
See application file for complete search history.

(56) References Cited

U.S. PATENT DOCUMENTS 3,800,142 A * 3/1974 Harshaw, II ................. 250/337
4,114,032 A * 9/1978 Brosow et al. .............. 235/493
4,761,543 A * 8/1988 Hayden ...................... 235/457
5,354,097 A * 10/1994 Tel ............................. 283/72
5,548,106 A * 8/1996 Liang et al. ................. 235/454
5,602,381 A * 2/1997 Hoshino et al. ............. 235/493
5,923,413 A 7/1999 Laskowski (Continued)

FOREIGN PATENT DOCUMENTS

CA 2172604 4/1995

(Continued)

*Primary Examiner*—Thien M. Le
*Assistant Examiner*—Tuyen K Vo
(74) *Attorney, Agent, or Firm*—Nexus Law Group LLP; Nicholas P. Toth

(57) ABSTRACT

A document authentication apparatus and system is provided comprising a scanner, PC, a central database and a network. The scanner emits a stimulus which illuminates security features such as ink, fibers or planchettes in or on a substrate of a value item such as a check, bank note, credit card or identification document. A sensor(s) detect the illuminated security features and values are generated relating to the color, coordinates on and depth of the security features in the substrate. The values are digitized and recorded for comparison when a value item is presented for authentication. Matching digitized values indicates a match of the substrates thereby identifying the value item.

41 Claims, 5 Drawing Sheets

U.S. PATENT DOCUMENTS

| | | | | |
|---|---|---|---|---|
| 6,101,266 | A | 8/2000 | Laskowski et al. | |
| 6,246,061 | B1 * | 6/2001 | Ramsey et al. | 250/458.1 |
| 6,273,413 | B1 | 8/2001 | Graef | |
| 6,315,194 | B1 | 11/2001 | Graef et al. | |
| 6,331,000 | B1 | 12/2001 | Beskitt et al. | |
| 6,573,983 | B1 | 6/2003 | Laskowski | |
| 6,607,081 | B2 | 8/2003 | Graef et al. | |
| 6,622,916 | B1 * | 9/2003 | Bianco | 235/454 |
| 6,774,986 | B2 | 8/2004 | Laskowski | |
| 7,090,122 | B1 * | 8/2006 | Warren et al. | 235/379 |
| 2002/0011431 | A1 | 1/2002 | Graef et al. | |
| 2002/0036159 | A1 | 3/2002 | Graef et al. | |
| 2003/0063772 | A1 | 4/2003 | Smith et al. | |
| 2003/0178609 | A1 * | 9/2003 | Hammond-Smith et al. | 252/587 |
| 2003/0210386 | A1 * | 11/2003 | Laskowski | 356/71 |
| 2004/0118920 | A1 | 6/2004 | He | |
| 2005/0100204 | A1 * | 5/2005 | Afzal et al. | 382/135 |
| 2006/0251291 | A1 * | 11/2006 | Rhoads | 382/100 |

FOREIGN PATENT DOCUMENTS

| | | | |
|---|---|---|---|
| CA | 2349681 | | 12/2001 |
| EP | 1300810 | A2 | 4/2003 |
| GB | 2324065 | A | 10/1998 |
| WO | 99/17486 | | 4/1999 |
| WO | 03052701 | A2 | 6/2003 |

* cited by examiner

APPARATUS AND METHOD FOR SECURE IDENTIFICATION OF SECURITY FEATURES IN VALUE ITEMS

FIELD OF THE INVENTION

This invention relates to securely identifying value items and, in particular, to a method and apparatus for scanning, recording and comparing of security features on or embedded in a substrate to verify the authenticity of a value item printed on or comprised of the substrate.

DESCRIPTION OF RELATED ART

Fraud in the financial industry is widespread. In response, various security features have been incorporated in and on value items such as checks, credit and debit cards, stock certificates, passports, visas, bank notes and paintings. The substrate of the value item may then be examined to recognize the security features and thereby be verified as authentic.

Several methods of illuminating fluorescent ink or fibers have been proposed, for instance Canadian patent application number CA2349681 ("Halter et. al.") and CA2172604 ("Liang et. al."). Such systems remain vulnerable to fraud by counterfeiting.

Halter et. al. discloses a system which reads the states of user-controllable calibration switches and illuminates a document bearing a fluorescent substance with an ultraviolet lamp. The system of Halter et. al. may detect spatial dimensions of bar codes printed with fluorescent substances. However, the use of calibration switches controlled by the user is time-consuming and adds complexity.

Liang et. al. discloses a system for identification of signets on documents which includes a laser beam for imaging a scanning line on a document and a stack of receiving lenses which are arranged in a row one behind the other. The light from each lens is passed through a respective reflection cone and falls onto a respective receiver. However, the use of stacked receiving lens and respective reflection cones adds complexity, requires precise alignment and impairs reliability of the system of Liang et. al.

SUMMARY

A scanning device is disclosed which includes at least one sensor adapted to receive radiation or emissions reflected from or transmitted through security features on a substrate. The emission received after being reflected from or received through the substrate is rendered into a digital value which corresponds to a particular color, size (length and thickness), location and/or depth of the security feature, which may be a fiber, ink or planchette.

A method of verifying the authenticity of a value item on a substrate is disclosed whereby the substrate is first illuminated with radiation, (including any type of electromagnetic radiation such as light or radio waves) for instance ultraviolet radiation, a sensed response is produced, the response is digitized, the digital response is recorded, and the recording is then compared with responses previously recorded and contained within a database, whereby authentication is achieved by finding a matched set of recorded responses indicating the same characteristic(s) of security feature(s) in a particular substrate, which may include color, location (x and y coordinates), size (length and thickness) and depth (z coordinate) of the security features.

Further features of the present invention will be understood in view of the detailed description of embodiments of the invention and the accompanying drawings.

DRAWINGS

DETAILED DESCRIPTION OF EMBODIMENTS OF THE INVENTION

There is provided an apparatus for obtaining a security signature of a value item having a substrate, the substrate having at least one security feature associated therewith, the apparatus including scanning means for scanning the value item, said scanning means comprising a sensor adapted to receive a response from an area of the substrate; and processing means for processing said response to produce a representation of said at least one security feature.

Referring to FIGS. 1 to 9, a method and apparatus for reading security information from a substrate 20 are disclosed.

Figure 1:
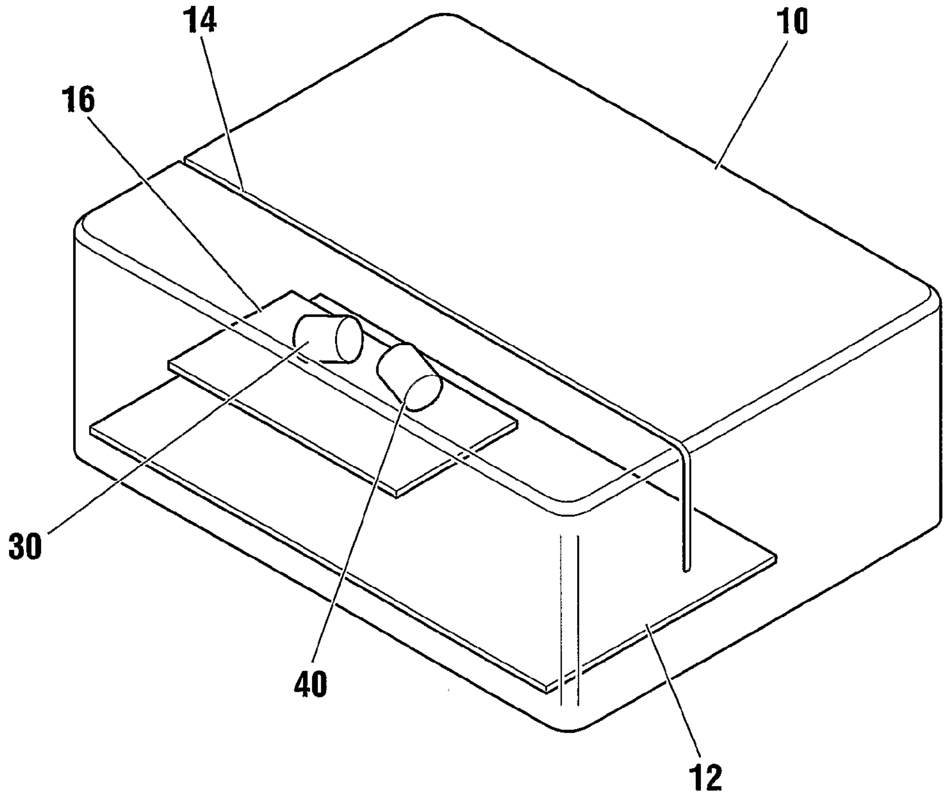
FIG. 1 is a perspective view of a scanning apparatus according to the invention.
Figure 2:
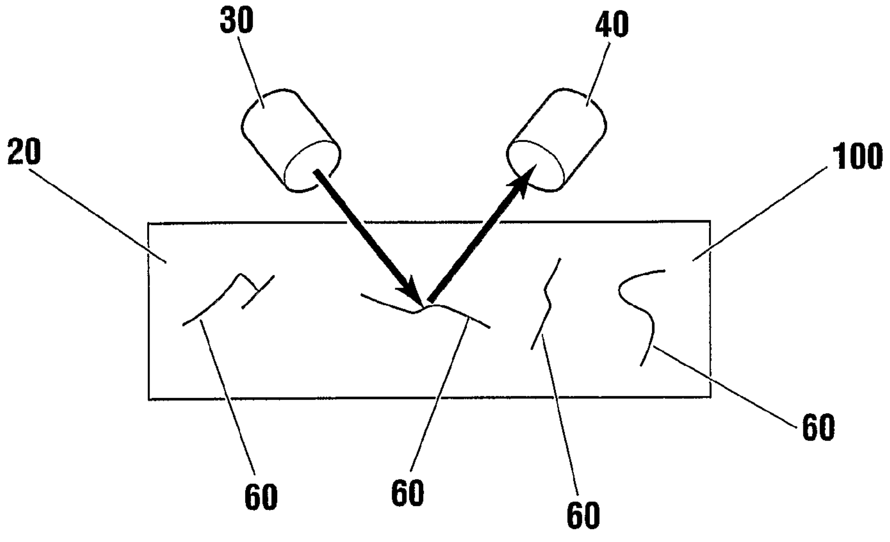
FIG. 2 is a schematic view of a stimulus and a sensor in a reflective configuration in conjunction with a substrate according to the invention.

This invention as illustrated by way of specific embodiments described herein can be applied to document verification, product authentication, item tracking, identity validation and other areas requiring secure identification or authentication of documents. Referring to FIGS. 1 to 2, a preferred embodiment may be used to authenticate value items 100. Value items 100 include items of financial or security value, such as checks, debit cards, credit cards, stock certificates, passports, identification documents, visas, bank notes, valuable documents and paintings.

Figure 5:
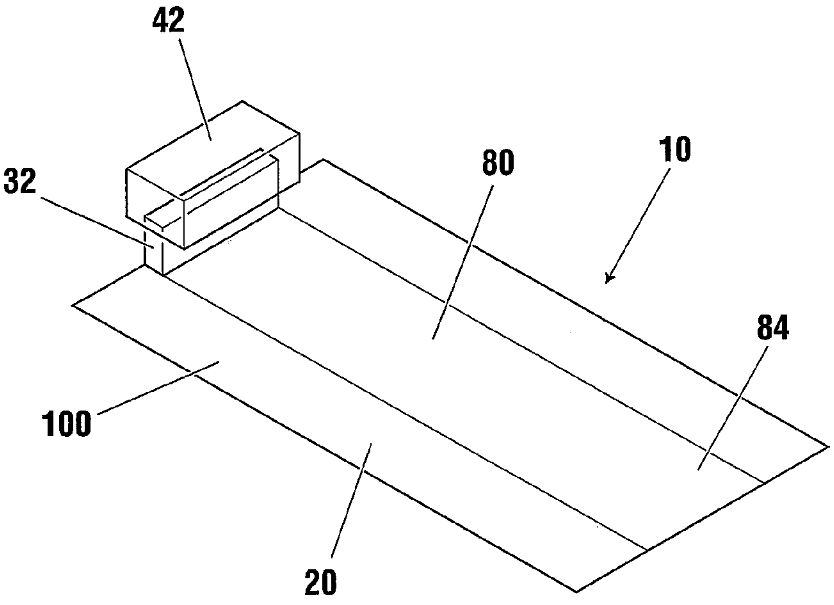
FIG. 5 is a perspective view of a sensor array scan configuration variation according to the invention.
Figure 6:
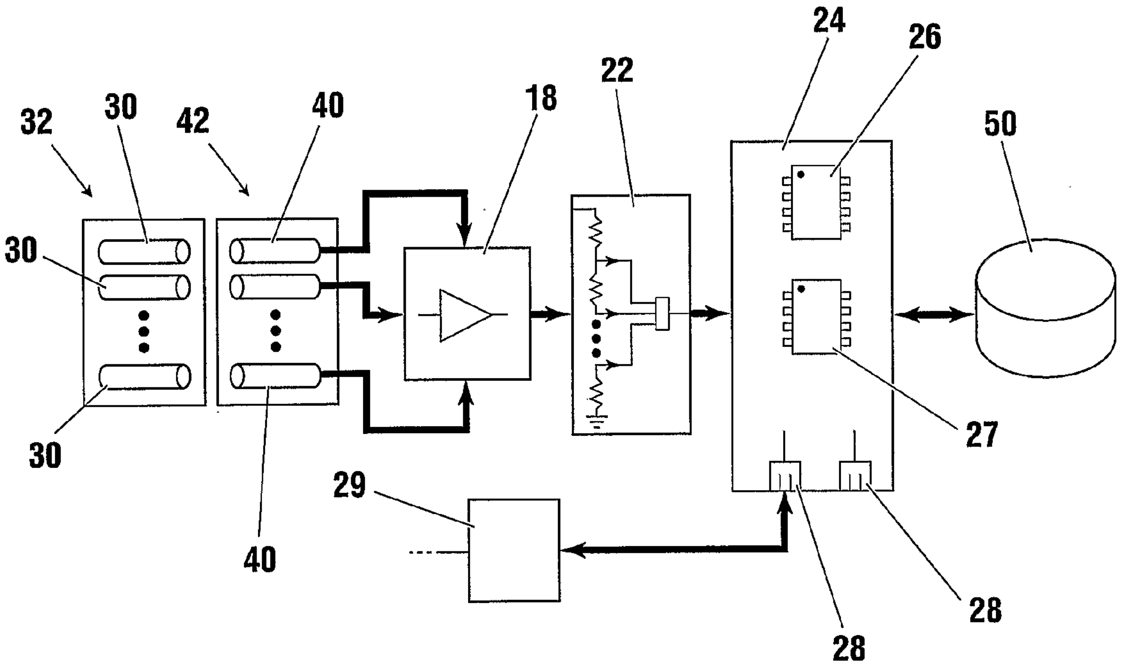
FIG. 6 is a diagrammatic representation of an electronic signature reader and process according to the invention.
Figure 8:
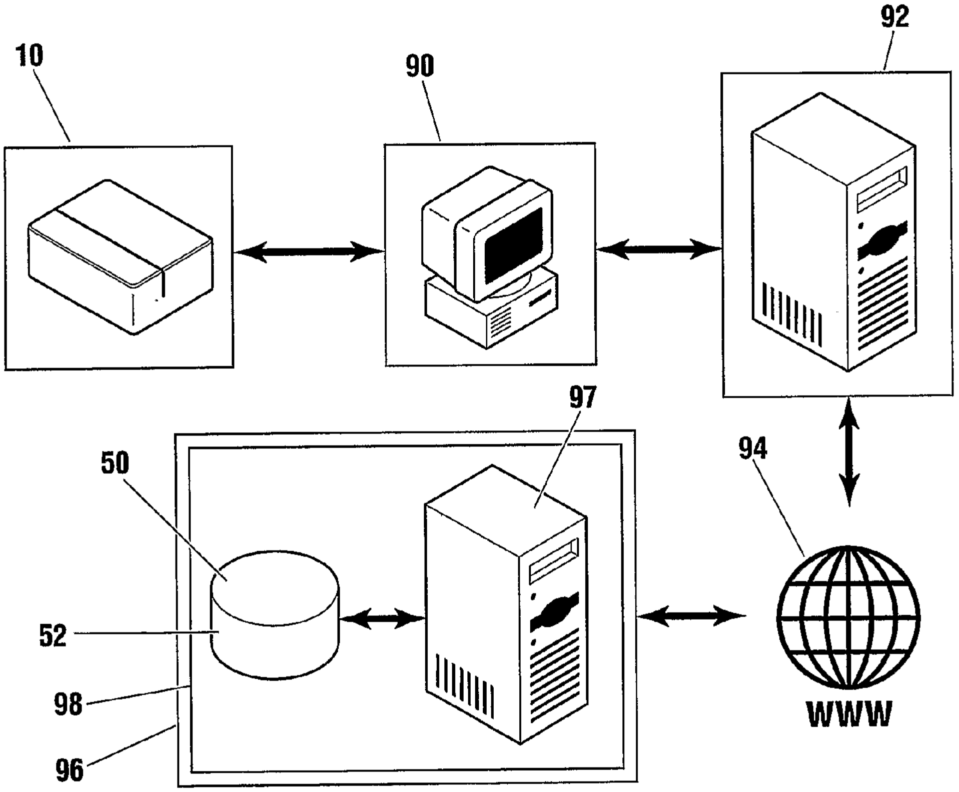
FIG. 8 is a block diagram representation of components of the authentication system according to the invention.

FIG. 1 is a cut-away perspective drawing of a preferred embodiment of the invention, including a terminal unit or scanning apparatus or scanner 10 which is an electronic device incorporating a radiating stimulus or source 30 and a sensor 40. The source 30 may include a light emitting diode (LED), which may be an energizing LED. The scanner 10 may include a main circuit board 12 housing a main circuit for controlling activities of the terminal unit 10, a track 14 to align and hold a value item 100, which may be a document, in position to pass in front of the source 30 and the sensor 40, and a sensor circuit board 16 for housing the sensor 40. The secure authentication system may employ multiple types of information relating to substrates 20 bearing value items 100 in a central database 50 (FIGS. 6 and 8) for comparison with value items 100 presented, to thereby identify counterfeit or non-authentic value items 100. For example, in a variation, an array 32 of multiple stimuli 30 and an array 42 of multiple sensors 40 are employed (FIGS. 5 and 6). The array 32 is either a combination of different types of stimuli 30 or a combination of the same type of stimulus 30. The array 42 is either a combination of different types of sensors 40 or a combination of the same type of sensor 40. The array of multiple stimuli 30 and the array of multiple sensors 40 may be employed to perform a variety of tasks including providing the same or different types of illumination and producing associated responses, respectively. The apparatus 10 is operable to scan the substrate 20, record sensor 40 responses, and communicate with the central database 50 (FIGS. 6 and 8), which may be a back-end central database system 52 (FIG. 8). Thus, there is provided an apparatus for obtaining a security signature of a value item having a substrate, the substrate having at least one security feature associated therewith, the apparatus including a scanner comprising a sensor adapted to produce a response associated with an area of the substrate; and a processor for calculating from said response a representation of said at least one security feature.

The scanner 10 functions for a range of substrates 20 including paper, wood, metal, cloth, glass, plastic or any solid material that can be painted, documented, or blended with security features during or after manufacturing. This wide range of substrates 20 can be employed because the security features 60 can be applied to the surface of a substrate 20 or blended into the raw material during the manufacturing process. The substrate 20 bears a value item 100, including forming a value item 100. The preferred embodiment of the present invention includes a narrow beam single source or stimulus 30 of ultraviolet ("UV") radiation (in the 200-1100 nm range) aligned to reflect from the substrate 20 of the value item 100 for reception by a UV detector or sensor 40. The preferred embodiment is suitable for use with a substrate 20 made of paper bearing value items 100 such as bank drafts and bank notes.

Security features or elements 60 can be monitored by the sensor 40. Some security elements 60 must be illuminated in order to stimulate (i.e. result in) a sensor 40 response. Examples of security features 60 include security fibers (single color, multi color, fluorescent color, and non-fluorescent color), security inks (single or multi-colored, either fluorescent or non-fluorescent), and planchettes. Stimuli 30 include electromagnetic radiation ranging from ultra-violet (UV) through the visible light range and into the infra-red (IR) range of the electromagnetic spectrum and by other means such as heat, laser or cold laser beams, radio waves, and other stimuli 30 suitable for use with magnetic ink readers, magnetic credit card readers, and magnetic strip readers. Sensor 40 may be a magnetic ink reader, magnetic credit card reader or a magnetic strip reader, for example.

The following operations may be performed:

1. The value item 100 is inserted in the scanner 10;

2. In the preferred embodiment, the stimulus or source 30 illuminates the substrate 20 with UV radiation. The type of illumination may be selected in accordance with the security features 60 and may be determined by the radiation type of the stimulus(i) 30 and sensor(s) 40;

3. The sensor(s) 40 monitor the security elements 60 by detecting radiation resulting from their "illumination" (where illumination can result from stimuli 30 including UV visible light, heat or other stimuli) (For greater clarity, each sensor 40 is operable to detect radiation that has either reflected off a surface of the substrate 20 exposed to illumination from the source(s) 30 or that has passed through the substrate 20, and to produce a sensor 40 response therefrom);

4. The data resulting therefrom is a sequence of numerical values which may represent, for example, the position or distance of the security element or feature 60 along a scanning or scan path 80 (FIG. 4) of the substrate 20, the X and Y axis coordinates of the security feature 60, size (length and thickness) of a component of the security feature 60, embedded depth in the manufactured material or substrate 20 of the security feature 60, and shade and color of the security elements 60. This sequence of values is referred to as the "Security Signature" or simply "Signature".

5. The Signature is then, in accordance with at least one embodiment of the invention, stored in the central database 50 (FIGS. 6 and 8) in its entirety without processing, or stored after being processed. Processing steps in the preferred embodiment include data reduction, signal processing, and normalization algorithms. In variations, the additional steps of data encryption and/or truncation of the data may be employed. Other data may be paired to a particular Signature, such as customer information, the identity of the payee or payor, value, location, payee's signature and branch information etc. As the value item 100, including a document for example, is transferred from one physical location to another, information may be added to the database 50 and the Signature re-verified.

6. After creating a digital record of the Signature, the authenticity of the value item 100 can be verified by repeating steps 1 through 5 (and, in accordance with at least one embodiment of the invention, at least steps 1 through 4) and comparing the resultant Signature to the contents of the database 50. If the Signatures (i.e. the Signature stored in the central database 50 prior to any activity on a specific value item 100 and the Signature obtained by repeating at least steps 1 through 4 using a value item 100 purporting to be the same as that specific value item 100) match, the value item 100, which may be a document for example, is verified as authentic by the system.

Referring to FIGS. 5 and 6, a further embodiment of the invention is directed at securely identifying a substrate 20 of a value item 100, where:

1. Electronic sensor 40 responses result from multiple positional locations along the substrate 20, where:
   a. One or more (array of different) electronic stimuli 30 and sensors 40 are used.
   b. If more than one stimulus 30 and sensor 40 is used, an array 32 of stimuli 30 and an array 42 of sensors 40 in which the stimuli 30 can be either of similar or of different types, for instance UV and IR, and in which the sensors 40 can be either of similar or of different types, for instance UV and IR.
   c. The array 32 of stimuli 30 and the array 42 of sensors 40 may be lined up and arranged horizontally or vertically across the scanning path 80 of the substrate 20 or substrates 20.
   d. The stimuli 30 and sensors 40 and substrate 20 can be moved with respect to each other to allow for the collection of sensor 40 response according to the X and Y coordinates on the substrate 20, embedded depth of the security features 60 in the manufactured material of the substrate 20, and color and shade of the security features 60, for example. In the preferred embodiment, which includes a single UV stimulus 30 and UV sensor 40, the substrate 20 is placed in the scanner 10 by an operator, and a motor (not shown) with contact heads grips the substrate 10 and pulls it through the scanner 10 at a constant rate, as in known in the industry. The motor can pull and/or push the substrate 20 in order to scan it a single time or multiple times.

e. When multiple sensors 40 (i.e. the array 42 of sensors 40) are used, either the sensors 40 can be stationary with respect to the substrate 20, or the substrate 20 is stationary and the array of sensors 40 moves. Therefore, the simultaneous sensing of multiple detecting locations can occur as a result of the multiple sensors 40.

f. In a variation, the array 42 of sensors 40 may be employed with one substrate 20, or on multiple of substrates 20 for the quick, efficient scanning of a large number of value items 100, including documents such as sheets of bank drafts.

g. The sensors 40 may respond to features 60 manufactured within the substrate 20, including features 60 which are natural imperfections occurring incidentally as a result of the manufactured substrate 20 and features 60 which are deliberately included within the substrate 20 during the manufacturing of the substrate 20, or security features 60 added and/or enhanced to the substrate 20 after manufacturing, including features 60 which are added and/or enhanced to the outer surface of the manufactured substrate 20 and features 60 which are embedded at a depth beneath the outer surface of the manufactured substrate 20, where it may be that:

i. The features 60 are placed randomly, including inherently resulting on or in the substrate 20 during the manufacturing process of the substrate 20 so as to be placed in a random arrangement, or deliberately;

ii. The features 60 are inherent in the substrate;

iii. The features 60 are added to the substrate; or iv. The features 60 are layered on top, bottom, or both sides of the substrate 20, including occurring inherently to at least a portion of the outer surface of the substrate 20 and being added deliberately to at least a portion of the outer surface of the substrate 20.

h. In a further variation, a stimulus or source 30 may not be required in order for the sensor 40 response to be generated as a result of the presence of the substrate 20. Some features 60 are discernable by the human eye using normal lighting conditions, for instance, and some features 60 are detectable by the sensor(s) 40 absent illumination from the source(s) 30, for example. Note:

i. A fluorescing security feature 60 (fiber 62, ink 64 planchette 66 etc.) requires UV stimulus in order to generate a sensor 40 response from a sensor 40, including a visible light sensor 40.

ii. A metal or heat sensitive fiber 62 requires a heat stimulus in order to generate a response from an Infra-Red ("IR") sensor 44.

i. The sensors 40 may have operability in respect of any section of the electromagnetic spectrum from UV through the visible light range and into IR, inclusive. In other words, the sensors will typically cover or receive electromagnetic radiation in the range of 200 nm through to 1100 nm.

2. The sensor(s) 40 responses are typically combined to create a Security Signature as follows:

a. The sensor 40 responses are digitized;

b. The digitized responses are normalized using an algorithm(s); and c. The normalized and digitized responses are combined, including being concatenated, to create a data sequence herein called Security Signature.

Note:

a. The Security Signature is reproducible, meaning that the same unadulterated substrate 20 may be scanned by different scanners 10 at various locations and the same Security Signature will be obtained, thereby re-authenticating the value item 100 at each step (for instance, bank "A" issues a draft and sends the Security Signature to the central database 50 (FIGS. 6 and 8). Bank "B" in turn receives the check and verifies the authenticity of the check and other important information such as the amount, payee name and so on, by confirming that the two Security Signatures match); and b. A repeatably captured Security Signature may be compared and analyzed for analysis, verification and authentication against substrates 20 presented for authentication.

In variations of embodiments in accordance with the present invention, the Security Signature may be subjected to additional processing steps, including:

a. Data reduction via an algorithm or algorithms, including a constant algorithm(s);

b. Data manipulation by signal-processing algorithms, whereby the raw data resulted from the sensors 40 is converted from analogue into digital, noise is reduced and a single Signature is created, which can be a sequence of binary, hexadecimal or decimal values (hexadecimal in the preferred embodiment);

c. Data encryption using an algorithm(s);

d. Data truncation using an algorithm(s); and e. Data manipulation by any other type of known mathematical manipulation desired.

The secure signature, with or without additional processing steps performed, may be stored in the central database 50. In the preferred embodiment, raw captured data is processed and both the raw captured data and the processed data is sent to the central database 50.

The substrate 20 may be made of any material that has naturally occurring random features that are machine readable, or that can have machine readable features embedded into the substrate 20, or that can have machine readable features layered on top, bottom or both sides of the substrate 20. Suitable substrate 20 materials include, but are not limited to: paper; cloth; plastic; glass; fiberglass; metal; wood; and any solid material (clear or not, for instance metal fibers 62 can be detected by the heat differential from the substrate 20) that could be either painted, printed, or carry a protective shield.

The authenticity of a substrate 20 may be verified by obtaining its Secure Signature as described above and then comparing the obtained Secure Signature to the contents of the database 50 of secure signatures. For example, a bank may print a bank draft on paper with magnetic ink identifying the number, bank and branch, with fluorescing fibers (or any of the above mentioned security features) embedded in the paper. An institution or a contractor may cause scanner 10 to scan sheets of bank drafts, including using the preferred embodiment of the device. The Signature, which may be the digital value corresponding to (i.e. representing) the information in the magnetic ink and the X and Y coordinates and size (length and thickness) and depth and colour of the fluorescing fibers 62 along the scanning path 80, is recorded and sent to the central database 50, for example. When the recipient of the bank draft presents the draft for authentication, the same process as that described in more detail above is performed or repeated. Matching numerical values indicate authenticity.

In the reflective configuration of the preferred embodiment, which includes stimulus 30 and sensor 40 shown in FIG. 2, the stimulus 30 and sensor 40 are on the same side of the substrate 20. The stimulus 30 illuminates an area of the substrate 20 and the sensor 40 receives reflected radiation from the illuminated area.

Figure 3:
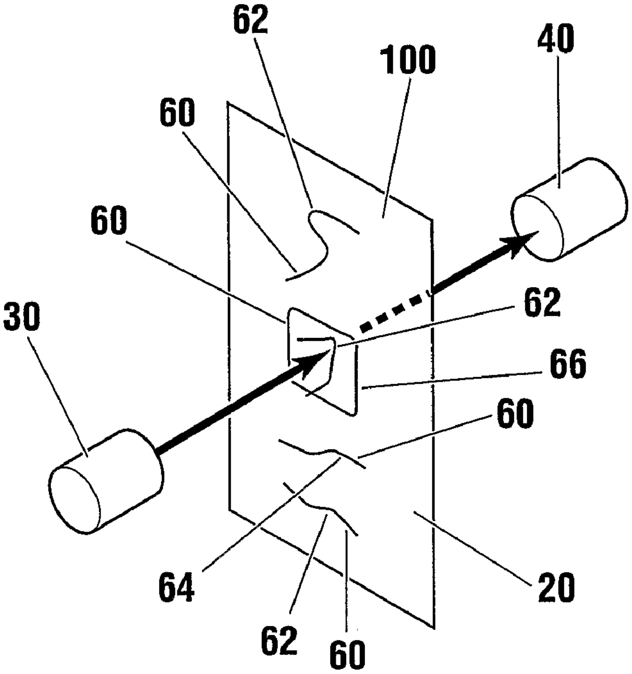
FIG. 3 is a schematic view of a non-reflective (i.e. transmissive) stimulus, sensor and substrate configuration variation of the invention.

In the thru-substrate configuration (as shown in FIG. 3), the stimulus 30 and sensor 40 are on opposite sides of the substrate 20. This variation is applicable where the substrate 20 has a level of transparency sufficient for the illumination (or the transfer of heat through) to result in a generated sensor 40 response.

Figure 4:
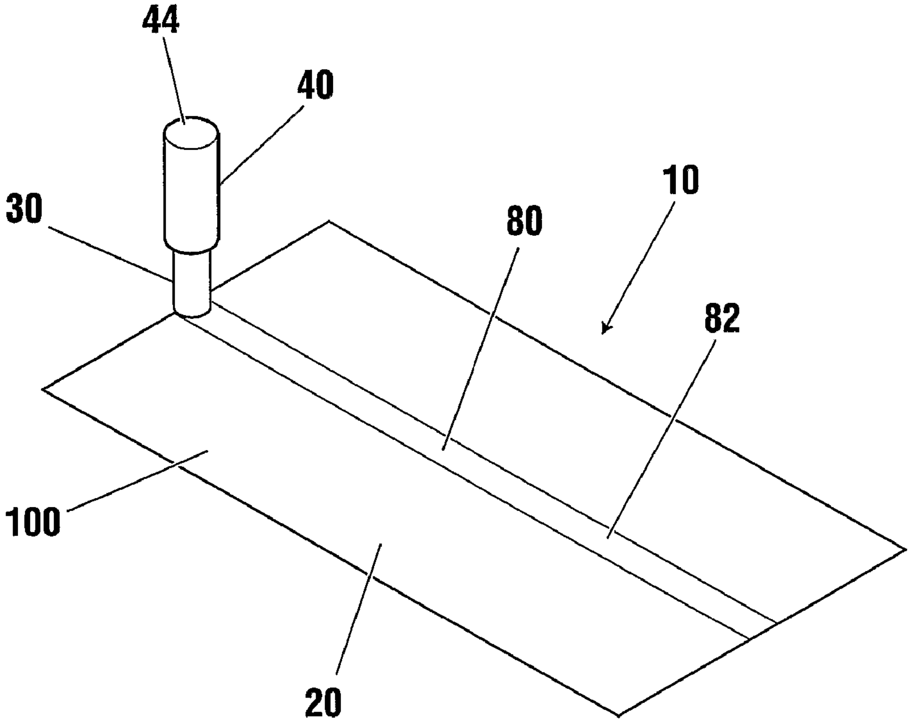
FIG. 4 is a perspective view of a narrow path scan configuration according to the invention.

FIGS. 4 and 5 show two suitable scan path 80 examples. FIG. 4 shows the narrow path 82 scan of the preferred embodiment, using a single stimulus 30 and a single sensor 40. FIG. 5 shows a wide path 84 scan that can either scan the substrate 20 from top to bottom or end to end (i.e. along its length or across its width). In a variation, the substrate 20 can be scanned both from its top to bottom and side to side.

The narrow path 82 scan is generated by either a single sensor 40 as is shown in FIG. 4, or by multiple sensors 40 such as in the line depicted in FIG. 5. In both cases, the sensor(s) 40 and substrate 20 are moved with respect to each other in order for the scan path 80 to be traversed. Data is collected from the sensor(s) 40 to describe the location on the X and Y axis, size (length and thickness), embedded depth in the substrate 20 and shade and color of the security elements 60 at multiple locations along the scan path 80, for example.

The wide path 84 scan can be generated by a single pass of a sensor array 40 (as shown in FIG. 5), or by multiple passes of a single sensor 40 (FIG. 4, for example). In either case, the sensor(s) 40 and substrate(s) 20 are moved with respect to each other in order for the scan path 80 to be traversed. Data will be collected from the sensor(s) 40 at positional intervals (of any interval) along the scan path 80 according to the X and Y axis, size (length and thickness), embedded depth in the manufactured material 20, and shade and color of the security elements 60 at multiple locations, for example. There is no limit on the size of the value item 100, including a document, or, consequently, the path to be read. In variations, the sensor (s) 40 detect the beginning and end of the document and send a defined number of reads in for calculation of the Signature. For industrial applications for instance, the substrate 20 can be large, such as sheets of bank drafts. The path may also be relatively small (e.g. narrow and/or short), for instance the magnetic strip on a credit card.

FIG. 6 is a schematic diagram showing electronics preferably required for the signature reader apparatus 10. The electronic apparatus 10 shown in FIG. 6 or any portion thereof may be implemented using techniques known in the art to form a single monolithic integrated circuit (IC) or a plurality of electronic devices in association with a single circuit board or a plurality of circuit boards.

Here, the stimuli 30 are paired to the sensors 40 as needed. The outputs of the sensors 40 are conditioned using analog electronics 18, as is known in the art. Then, the conditioned analog signals are digitized in the analog to digital converter 22 to produce a data sequence of digitized values. As shown in FIG. 6, the processor 24 may include a microprocessor or micro-controller 26, memory 27 and one or more peripheral interfaces 28. The processor 24 is operable to take the digitized values and stores them in the memory 27. Preferably at the end of the scan, the processor 24 processes the data sequence, then sends it to the central database system 50, including sending the data sequence directly or indirectly to the central database system 50 for verification. The processor 24 also performs the motion control or a motion control 29 (FIG. 6) separate from the processor 24 may be used. The motion control 29 moves the substrate 20, or, in a further variation, it moves the sensor 40 and/or stimulus 30, or, in a further variation, it monitors the movement of a hand swiped substrate 20.

The following examples of the invention in operation are provided in order to better understand the technology and description made above.

Example 1

Secure Signature from a Bank Check Containing Fluorescing Security Fibers

In this example the value item 100 is a standard bank check and the material of substrate 20 is paper. The paper for the bank check is manufactured with embedded UV fluorescing fibers. The fibers 62 fluoresce with a specific color for the particular bank (Ex. Green) in the visible light range.

The scanner 10 uses a UV stimulus as the stimulus 30, and a photodiode with a specific filter in respect to the color for the sensor is employed. That is, the sensor 40 is operable to detect electromagnetic radiation having a wavelength in a range of the electromagnetic spectrum corresponding to the specifically selected color (Ex. Green). The stimulus 30 and sensor 40 are configured (in this scenario) in a reflective configuration, but in a variation, in a thru-substrate configuration (as long as the paper provides sufficient transparency to result in a generated sensor 40 response).

The check can be moved with respect to the sensor. This causes the sensor 40 to move along (i.e. detect radiation reflected from the exposed area of the surface of the check along) the scan path 80.

By collecting sensor 40 data at positional intervals along the scan path, including, for greater clarity, collecting sensor 40 data at temporal intervals sequentially associated with positions along the scan path, a data set is generated. This data set consists of sensor 40 magnitude readings at each data position associated with a position along the scan path 80. When the sensor views (i.e. detects radiation from) a fiber 62 that fluoresces with a set color (Ex. Green), its magnitude will be high. Whereas, areas of the substrate 20 void of the set color (Ex. Green) will result in generated minimal (i.e. low magnitude) responses from the sensor 40.

The data set comprises the Secure Signature. The Signature is a unique representation of the fiber 62 distribution along the given scan path 80 of a single document or value item 100, for example, which may include the location of the fiber 62 on the X and Y axis defined as corresponding to an area of the substrate 20, size (length and thickness) of at least one security feature 60, the embedded depth in the manufactured material of at least one security feature 60, and shade and color of the security features 60 (in this example the fiber 62).

Figure 7:
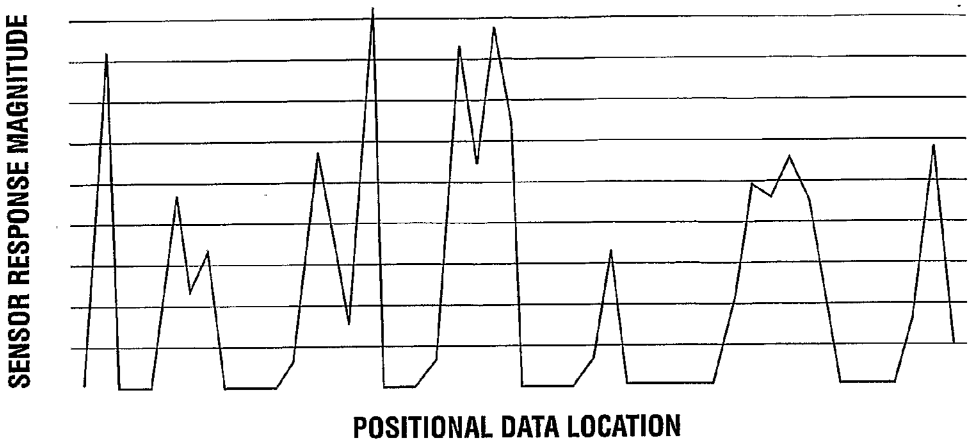
FIG. 7 is a graph showing sensor response magnitude versus positional location in accordance with the invention.

A graphical representation of the Secure Signature is created by plotting the sensor 40 magnitude versus position along the scan path 80, for example. FIG. 7 is a graph showing an example scanner 10 output of the magnitude of the sensor 40 response versus the positional data location (i.e. position along the scan path 80). This plot is a reproducible representation of the fluorescing fiber 62 distribution along the scan path 80 of a given value item 100, which may be a check or document, for example.

The Secure Signature can then be processed and stored in a central database 50.

At a later time, a new scan of the check can result in a new representation that can be compared to the stored signature in the database 50 for verification of the authenticity of the value item 100, which may be a check.

FIG. 8 is a diagrammatic representation showing components of the authentication system in the preferred embodiment. The terminal reader or scanner 10 is connected to a client PC (Personal Computer) 90, which transfers the Signature to a branch LAN (Local Area Network) server 92, then over a direct link or Internet link or network 94 to a processing centre 96. A transaction processing engine 97 of a central processing server 98 of the processing centre 96 is operable to compare the Signature to the Signatures already stored in the central processing server 98, and informs the branch LAN server 92 whether there is a match or not. FIG. 8 shows the central database 50, which in the exemplary embodiment shown in FIG. 8 is the back-end central database system 52, in communication with the transaction processing engine 97 within the central processing server 98 of the processing centre 96.

Figure 9:
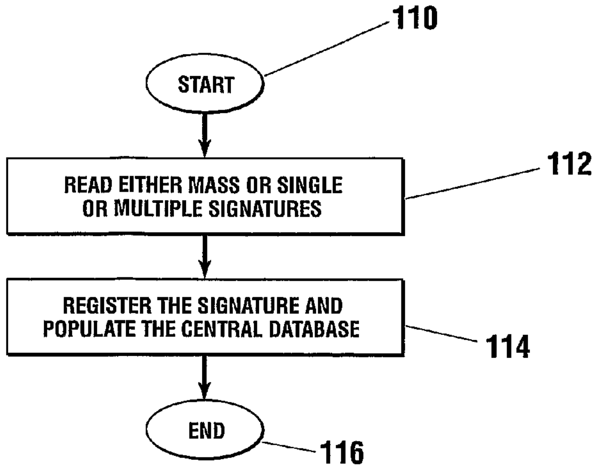
FIG. 9 is a flow chart of operation steps of a scanning and database creation process according to the invention.

FIG. 9 is a flow chart of the operational steps of the scanning and database creation process according to the invention. This exemplary process, shown generally at 110 in FIG. 9, will collect the signature of a value item 100, which may be a document or documents, then store the signature in a central repository prior to any activity on that specific document. As indicated at step 112 of FIG. 9, the process 110, which involves registering the Signature, commences with the substrate 20 being inserted in the scanner 10 to collect the Signature associated with that substrate 20 and, consequently, associated with that substrate bearing the originally issued value item 100. Signatures of different documents may be read sequentially or together in a mass reading, as indicated at step 112 of FIG. 9. Multiple readings of signatures may occur, as indicated at step 112 of FIG. 9. The electronic or digital record comprising the Signature is stored in a central repository such as the central database 50 prior to any activity on that specific document or value item 100. Storing multiple Signatures in the central database 50 may be referred to as populating the central database 50, as indicated at step 114 shown in FIG. 9. The process 110 then ends at step 116 of FIG. 9.

After completing the process 110 shown in FIG. 9, the value item 100, which may be a document, typically passes through a routine process as is presently happening in the industry. Such routine process is known in the art and may include levels of the routine process. In accordance with the embodiments of the invention described herein, the Signature may be checked (i.e. identified) at any and each level of such routine process.

Figure 10:
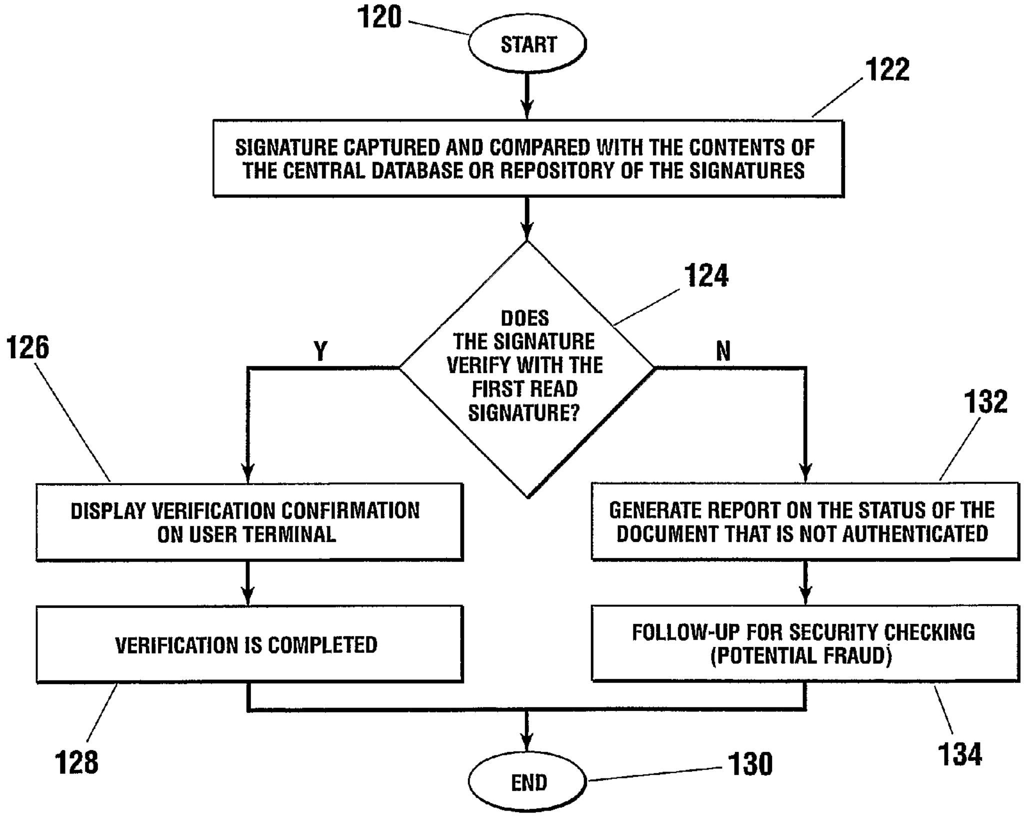
FIG. 10 is a flow chart of operation steps of checking a Signature with a central database or repository of signatures according to the invention.

FIG. 10 is a flow chart of a process, indicated generally at 120, of checking a Signature with the central database or repository of the signatures according to the invention. Referring to FIG. 10, eventually (i.e. it is contemplated that at a later time), the substrate 20 is presented to an institution or individual wishing to verify whether the substrate 20 is the same one bearing the originally issued value item 100. When the document is produced, its Signature is captured and stored in the central database 50 (i.e. prior to any activity on that specific document). Then when the document is processed either in the same location or at other locations, the Signature is captured and compared with the original Signature in the database 50 for the authentication, as indicated at step 122 of FIG. 10. The Signature of the presented value item 100, which may be a document, is compared with those Signatures stored in the central database 50 (step 122 of FIG. 10) and if there is an appropriate match (as determined at step 124 of FIG. 10), the users display terminal (e.g. a display terminal at the branch LAN server 92 shown in FIG. 8) displays a confirmation verifying the authenticity of the document, as indicated at step 126 of FIG. 10. The signature of the originally issued value item 100 is referred to in FIG. 9 as the "first read signature". After the verifying confirmation is displayed, the verification process is completed, as indicated at step 128 of FIG. 10, and the process 120 ends at step 130. If there is no match (as determined at step 124 of FIG. 10), a report is automatically generated indicating that the presented substrate 20 is invalid or counterfeit, as indicated at step 132 of FIG. 10. Subsequent to the generation of the report on the status of a document which is not authenticated (step 132), a follow-up process for security checking to check for potential fraud may occur, as indicated at step 134 of FIG. 10, and the process 120 ends at step 130.

Thus, there is provided a method of obtaining a security signature of a value item having a substrate, the substrate having at least one security feature associated therewith, the method including receiving a response from an area of the substrate by a sensor of a scanner; and calculating from said response a representation of said at least one security feature.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for obtaining a security signature of a value item having a substrate, the substrate having at least one security feature associated therewith, the apparatus comprising:

a) a scanner comprising a track dimensioned for receiving the value item, a plurality of LEDs for respectively illuminating a plurality of areas of the substrate along a scan path of the substrate when the value item is being received along said track, said plurality of LEDs respectively illuminating said plurality of areas with electromagnetic radiation having wavelengths in a plurality of different wavelength ranges selected from the group consisting of ultraviolet, visible light and infrared, and a plurality of radiation sensors for respectively detecting a plurality of responses of electromagnetic radiation reflected from said plurality of areas and having wavelengths in one or more sensor wavelength ranges selected from the group consisting of ultraviolet, visible light and infrared wherein each of said plurality of responses is selected from a group such that said each response is not selected as a magnetic response; and b) a processor for calculating from said plurality of responses a representation of said at least one security feature, said at least one security feature comprising a plurality of-fibers of the substrate, said representation of said at least one security feature comprising data representing an embedded depth in the substrate of one or more fibers of said plurality of fibers, a location of said one or more fibers, and a size of said one or more fibers, wherein the apparatus is operable to transmit said representation to a database.

2. The apparatus of claim 1, wherein said representation of said at least one security feature comprises data representing at least one characteristic selected from the group consisting of: the shade of said at least one security feature and the color of said at least one security feature.

3. The apparatus of claim 1, wherein said at least one security feature includes a security feature selected from the group consisting of: at least one fiber having a single color, at least one fiber having multiple colors, at least one fiber having a fluorescent color, ink having a single color, ink having multiple colors, ink having a fluorescent color, at least one fiber comprising metal, at least one heat sensitive fiber, and a planchette.

4. The apparatus of claim 1, wherein said representation of said at least one security feature comprises a representation of a fiber distribution along said scan path of the substrate.

5. The apparatus of claim 1 further operable to illuminate the substrate with radiation selected from the group consisting of laser beam radiation; radio waves; and heat radiation.

6. The apparatus of claim 5, further operable to detect radiation selected from the group consisting of laser beam radiation; radio waves; and heat radiation.

7. The apparatus of claim 1, wherein said scanner is operable to cause said plurality of LEDs to move.

8. The apparatus of claim 1, wherein said plurality of radiation sensors and said plurality of LEDs are in an aligned arrangement.

9. The apparatus of claim 1, wherein said scanner is operable to cause said plurality of radiation sensors to move.

10. The apparatus of claim 1, further comprising a motor for pulling the substrate along said track of said scanner.

11. The apparatus of claim 1, further comprising a motor for pushing the substrate along said track of said scanner.

12. The apparatus of claim 1, wherein said scanner is operable to scan a plurality of documents.

13. The apparatus of claim 1, wherein the substrate is made of a material selected from the group consisting of: paper, wood, metal, cloth, glass, plastic, and fiberglass.

14. The apparatus of claim 1, wherein said at least one security feature comprises a security feature inherent to the substrate.

15. The apparatus of claim 1, wherein said at least one security feature comprises a security feature added to the substrate after the substrate has been manufactured.

16. The apparatus of claim 1, wherein said at least one security feature comprises a security feature on the top of the substrate.

17. The apparatus of claim 1, wherein said at least one security feature comprises a security feature on the bottom of the substrate.

18. A system for authenticating a value item having a substrate, the substrate having at least one security feature associated therewith, the system comprising:

a) the apparatus of claim 1;

b) said database containing at least one stored security signature; and c) a database processor operable to compare each of said at least one stored security signature and said representation of said at least one security feature, the value item being authenticated when said representation matches one of said at least one stored security signature.

19. The system of claim 18, wherein said database includes information associated with said at least one stored security signature, said information being selected from a group consisting of: customer information, payee identity information, payor identity information, value information, location information, payee's signature, and branch information.

20. The system of claim 18, wherein said database processor is operable to add information to said database.

21. The system of claim 18, wherein the value item is selected from the group consisting of: financial check, debit card, credit card, stock certificate, passport, identification document, visa, bank note, document of value, and painting.

22. The system of claim 18 wherein the apparatus of claim 1 is operable to transmit said representation to said database via a global communications network.

23. The apparatus of claim 1 wherein the apparatus is operable to transmit said representation to said database via a global communications network.

24. A method of obtaining a security signature of a value item having a substrate, the substrate having at least one security feature associated therewith, the method comprising:

a) receiving the value item along a track of a scanner, said track being dimensioned for receiving the value item;

b) when the substrate is being received along said track, respectively illuminating a plurality of areas of the substrate along a scan path of the substrate by a plurality of LEDs with electromagnetic radiation having wavelengths in a plurality of different wavelength ranges selected from the group consisting of ultraviolet, visible light and infrared;

c) respectively detecting by a plurality of radiation sensors of said scanner a plurality of responses of electromagnetic radiation reflected from said plurality of areas and having wavelengths in one or more sensor wavelength ranges selected from the group consisting of ultraviolet, visible light and infrared wherein each of said plurality of responses is selected from a group such that said each response is not selected as a magnetic response;

d) calculating by a processor from said plurality of responses a representation of said at least one security feature, said at least one security feature comprising a plurality of-fibers of the substrate, by producing data representing an embedded depth in the substrate of one or more fibers of said plurality of fibers, a location of said one or more fibers, and a size of said one or more fibers; and e) transmitting said representation to a database.

25. The method of claim 24, wherein calculating by a processor from said plurality of responses a representation of said at least one security feature, said at least one security feature comprising a plurality of fibers of the substrate, by producing data representing an embedded depth in the substrate of one or more fibers of said plurality of fibers, a location of said one or more fibers, and a size of said one or more fibers comprises digitizing said plurality of responses to produce said data and compressing said data.

26. The method of claim 24, wherein calculating by a processor from said plurality of responses a representation of said at least one security feature, said at least one security feature comprising a plurality of fibers of the substrate, by producing data representing an embedded depth in the substrate of one or more fibers of said plurality of fibers, a location of said one or more fibers, and a size of said one or more fibers comprises digitizing said plurality of responses to produce said data and normalizing said data.

27. The method of claim 24, wherein calculating by a processor from said plurality of responses a representation of said at least one security feature, said at least one security feature comprising a plurality of fibers of the substrate, by producing data representing an embedded depth in the substrate of one or more fibers of said plurality of fibers, a location of said one or more fibers, and a size of said one or more fibers comprises digitizing said plurality of responses to produce said data and encrypting said data.

28. The method of claim 24, wherein calculating by a processor from said plurality of responses a representation of said at least one security feature, said at least one security feature comprising a plurality of fibers of the substrate, by producing data representing an embedded depth in the substrate of one or more fibers of said plurality of fibers, a location of said one or more fibers, and a size of said one or more fibers comprises digitizing said plurality of responses to produce said data and truncating said data.

29. The method of claim 24, wherein transmitting said representation to a database comprises transmitting said representation to said database when said database contains at least one stored security signature.

30. The method of claim 29 wherein transmitting said representation to said database when said database contains at least one stored security signature comprises transmitting said representation via a global communications network.

31. The method of claim 24, further comprising heating the substrate.

32. The method of claim 31, further comprising detecting heat radiation.

33. The method of claim 24, further comprising comparing said representation with a stored security signature contained in said database.

34. The method of claim 24 wherein transmitting said representation to a database comprises transmitting said representation via a global communications network.

35. An apparatus for obtaining a security signature of a value item having a substrate, the substrate having at least one security feature associated therewith, the apparatus comprising:

a) scanning means for scanning the value item, said scanning means comprising a track dimensioned for receiving the value item, illuminating means for illuminating a plurality of areas of the substrate along a scan path of the substrate when the value item is being received along said track, said illuminating means comprising a plurality of LEDs respectively illuminating said plurality of areas with electromagnetic radiation having wavelengths in a plurality of different wavelength ranges selected from the group consisting of ultraviolet, visible light and infrared, and sensor means for respectively detecting a plurality of responses of electromagnetic radiation reflected from said plurality of areas, said sensor means comprising a plurality of radiation sensors, said plurality of responses of electromagnetic radiation having wavelengths in one or more sensor wavelength ranges selected from the group consisting of ultraviolet, visible light and infrared wherein each of said plurality of responses is selected from a group such that said each response is not selected as a magnetic response;

b) processing means for processing said plurality of responses to produce a representation of said at least one security feature, said at least one security feature comprising a plurality of fibers of the substrate, said representation of said at least one security feature comprising data representing an embedded depth in the substrate of one or more fibers of said plurality of fibers, a location of said one or more fibers, and a size of said one or more fibers; and c) transmission means for transmitting said representation to a database.

36. The apparatus of claim 35, further comprising motorized means for moving at least one of said illuminating means, said sensor means and the substrate.

37. The apparatus of claim 35, further operable to illuminate the substrate with radiation selected from the group consisting of laser beam radiation; radio waves; and heat radiation.

38. The apparatus of claim 37, further operable to detect radiation selected from the group consisting of laser beam radiation; radio waves; and heat radiation.

39. The apparatus of claim 35, wherein the substrate is made of paper.

40. The apparatus of claim 35, wherein the value item is printed on the substrate.

41. The apparatus of claim 35 wherein said transmission means is operable to transmit said representation to said database via a global communications network.

* * * * *